United States Patent

Tiefenthal

[11] 3,936,841
[45] Feb. 3, 1976

[54] PHOTOCOMPOSING APPARATUS

[75] Inventor: Josef Maria Herbert Tiefenthal, Surrey, England

[73] Assignee: The Monotype Corporation, Limited, London, England

[22] Filed: Sept. 26, 1973

[21] Appl. No.: 400,826

[30] Foreign Application Priority Data
Oct. 2, 1972 United Kingdom.............. 45296/72

[52] U.S. Cl. ................................................. 354/10
[51] Int. Cl.² ......................................... G03B 23/00
[58] Field of Search ................... 354/5, 10, 12, 17, 6

[56] References Cited
UNITED STATES PATENTS

| | | | |
|---|---|---|---|
| 2,392,224 | 1/1946 | Bryce | 354/6 |
| 2,600,168 | 6/1952 | Klyce | 354/7 |
| 3,142,235 | 7/1964 | Siegmund | 354/150 |

*Primary Examiner*—John M. Horan
*Attorney, Agent, or Firm*—Morgan, Finnegan, Pine, Foley & Lee

[57] ABSTRACT

Photo-composing apparatus comprising a projection system for projecting optical images onto a photo-sensitive recording member by way of a mirror which is rotatable to displace projected images with respect to the recording member, and an element formed by substantially parallel optical fibres between the mirror and the position in which the recording member will be held. The element has first and second major surfaces, the first major surface being concave, and facing the mirror, the second major surface having a radius of curvature substantially greater than that of the first major surface. The optical fibres extending between the first and second major surfaces, and the axis of rotation of the mirror is at the effective centre of curvature of the first major surface.

6 Claims, 7 Drawing Figures

PHOTOCOMPOSING APPARATUS

This invention relates to photo-composing apparatus, and more particularly to photo-composing apparatus for projecting a sequence of characters from a projection system, including a character matrix, onto a photosensitive recording member by means of a rotatable mirror.

In a common photo-composing system, characters selected from a character matrix are projected onto a strip of photo-sensitive film by a mirror rotatable about an axis to displace images on the film. While this type of system obviates the necessity to displace either the projection system or the film before the projection of each new character, it has the disadvantage that image distortion occurs at the ends of the film unless the film is bent into an arc, whose centre of curvature lies at the mirror.

The object of this invention is to provide a photo-composing system, and in particular, an image field flattening element which alleviates this problem.

According to one aspect of the invention, there is provided photo-composing apparatus comprising a projection system for projecting optical images of characters onto a photo-sensitive reading member by way of a mirror which is rotatable to displace projected images with respect to the recording member, means defining a position for the reading member and between the mirror and the said position for the recording member, an element formed by substantially parallel optical fibres, the element having first and second major surfaces, the first major surface being concave, and facing the mirror, the second major surface having a radius of curvature substantially greater than that of the first major surface, the optical fibres extending between the first and second major surfaces, and the axis of rotation of the mirror being at the effective centre of curvature of the first major surface.

In a preferred embodiment, the second major surface is plane, and the fibres are disposed so that each fibre is radial to a centre which is further from the element than the centre of curvature of the concave surface, so as to produce a minimum distortion at the second major surface. More particularly, minimum distortion is achieved when the arcuate distance from the centre line of the fibre element to that end of the fibre on the concave surface as measured along said concave surface is equal to the distance from the centre line to the end of the fibre on the second major surface. The centre line may be defined as the line corresponding to an extension of the shortest fibre in either direction.

Further features of the invention will appear from the following description of one embodiment given by way of example only, reference being made to the accompanying drawings in which.

Figure 1:
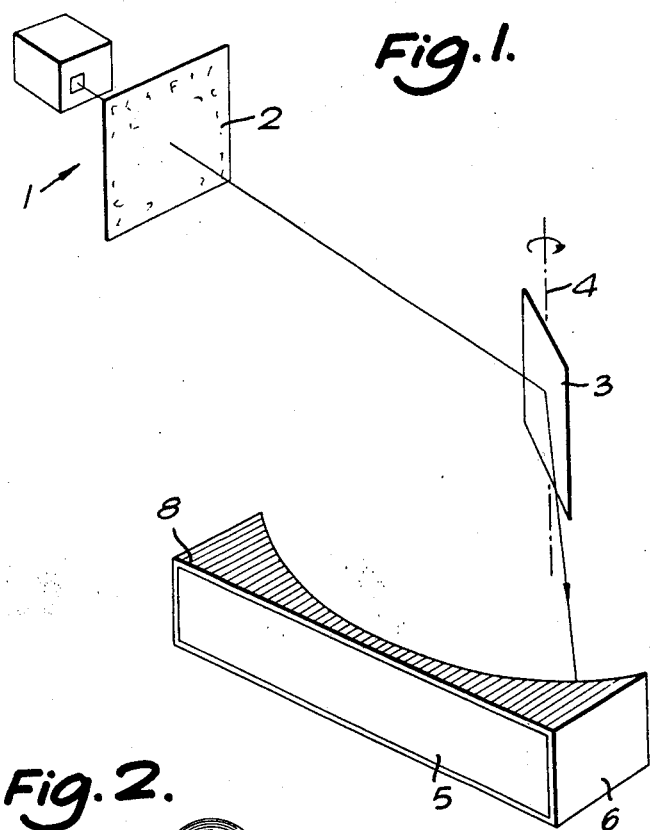
FIG. 1 is a schematic diagram illustrating a photo-composing apparatus according to the invention.
Figure 2:
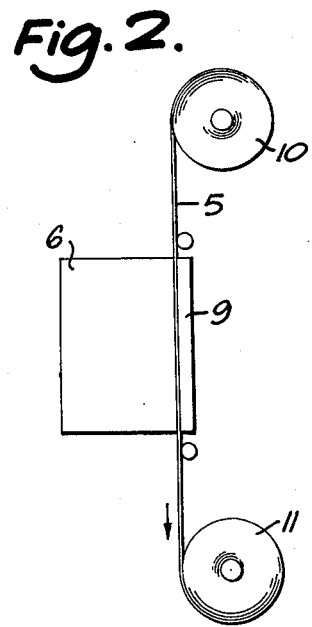
FIG. 2 shows a side elevation view of an arrangement for film feed.

In FIG. 1 there is illustrated a photo-composing system comprising a projection system 1, including a character matrix 2 which is moveable for selection of characters to be projected, and a mirror 3 pivotable about an axis 4 for reflecting images of selected characters to a film 5. A field flattening element 6 disposed between the mirror and the film obviates the necessity to bend the film into an arc. The images are projected onto a concave surface 7 of the element 6, and the film is held against a flat surface 8, by means of a backing element 9. The film is moveable between feed and take up spools 10 and 11 after the exposure of the film to each successive line of characters.

Figure 3:
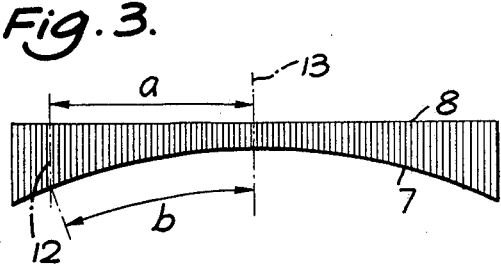
FIG. 3 is a diagram showing, in sectional plan view, an image field flattening element.

The field flattening element 6 comprises a fibre optic face plate, an example of which is shown in FIG. 3. The face plate comprises a large number of optic fibres 12 laid parallel and bound or bonded together to form a plate, with the concave surface 7 ground on one side and the plane surface 8 against which may be held the photographic film with its photosensitive surface adjacent the face plate, on the other side. The optic fibres in the element shown in FIG. 3 are all normal to the plane surface 8. Character images reflected by the rotatable mirror and incident on the concave surface are then transferred by the optic fibres through the face plate to the plane face and thus onto the photographic film. This image field is thus "flattened". However, as is clear from FIG. 3 the distance a between that end of the particular fibre 12, shown shaded, which emerges at the plane surface 8 and the centre line 13 of the face plate is less than the distance b between the end of that fibre 12 emerging at the concave surface and the centre line, as measured along the concave surface. The image is therefore "condensed" on being transferred from the concave to the plane surface, and an opposite form of distortion is introduced.

Figure 4:
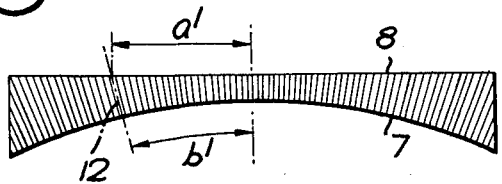
FIG. 4 is a diagram showing, in sectional plan view, another image field flattening element.

The face plate shown in FIG. 4 is composed of fibres which are all normal to the curved surface 7. In this arrangement the distance a' on the plane surface is greater than the distance b' on the concave surface, causing extension of the image incident on the face plate, and therefore reintroducing the original distortion.

Figure 5:
FIG. 5 is a diagram showing, in sectional plan view a further image field flattening element.

A combination of the two types of face plate, as shown in FIG. 5 could be made, in which the distortion of the one type of face plate were cancelled by an equal and opposite distortion of the other. However, this system would involve some considerable loss of transmission since there would be a break in each fibre light path.

It is evident that there must be orientation of the optic fibres between the orientation of the fibres of the plate in FIG. 3 and the radial orientation of the fibres of the plate in FIG. 4, for which the distortion of the image on passing through the plate is 0.

Figure 6:
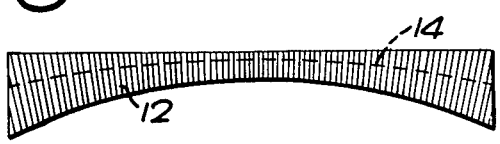
FIG. 6 is a diagram showing in sectional plan view a still further image field flattening element.

In FIG. 6 there is shown an improved arrangement, where the face plate is produced by the following steps:

a. The flat base plate is bent as to acquire a specific curvature of radius much larger than the radius eventually required for the concave surface of the plate;

b. the concave surface is ground to a curvature having the required radius;

c. the convex side of the face plate is ground flat.

Figure 7:
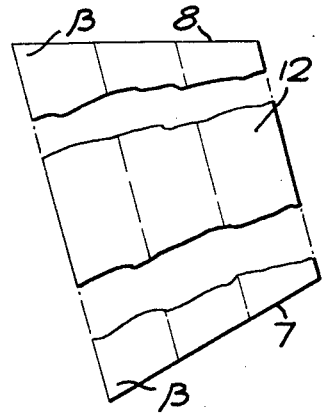
FIG. 7 is a diagram illustrating geometrically how distortion may be reduced by a specific orientation of the optic fibres.

The resulting fibre optic face plate has a structure as shown in FIG. 6. The axes of the fibres (which may have diameters of the order of 6 μm) are all normal to the curve 14 into which the plate was originally bent before grinding. For small angles of displacement from the centre line, it can be generally stated that for each fibre, the angle between its axis and the tangent to the concave surface at the point of intersection of the fibre and the concave surface is equal to the angle between its axis and the flat surface, these angles being indicated as B in FIG. 7.

More specifically, it is more accurate over wider angles of displacement to state that each fibre of the face plate of FIG. 6 is so orientated that the arcuate distance from the centre line of the face plate to the fibre measured along the concave surface equals the distance from the centre line to that fibre measured along the plane surface.

It can be shown mathematically, that for a nominally thin face plate and a limited, but reasonable angle of movement of the light beam from the centre line, the distortion across the width of the face plate is minimal when the radius of curvature of the line 14 is three times the radius of curvature of the concave surface 7.

I claim:

1. In a photocomposing apparatus comprising a projection system for projecting optical images onto a photosensitive surface of a recording member by way of a mirror, which is rotatable to displace projected images with respect to the recording member; means defining a position for the recording member; an optical field-flattening element formed by substantially parallel optical fibers and arranged berween the rotatable mirror and said position for a recording member, the element having a first concave major surface, which faces the rotatable mirror so as to receive optical images reflected therefrom, and a second major surface which is substantially flatter than the first major surface, the optical fibers being arranged to transmit optical images from said first to said second major surface, whereby the field of said optical images is substantially flattened on transmission from said first to said second major surface, said means defining a position comprising means for retaining the recording member with its photsensitive surface adjacent the second major surface and the axis of rotation of the mirror being at the effective center of curvature of the first major surface.

2. Photocomposing apparatus according to claim 1 wherein the second major surface is a plane surface.

3. Photocomposing apparatus according to claim 1 wherein the optical fibres are parallel to each other.

4. Photocomposing apparatus according to claim 1 wherein the optical fibres are arranged radially and extend normally to the first major surface.

5. Photocomposing apparatus according to claim 1 wherein the fibres are disposed such that each fibre is radial to a point which is further away from the element than the centre of curvature of the first major surface, so as to produce a minimum distortion at the second major surface.

6. Photocomposing apparatus according to claim 5 wherein the distance from said point to said element is approximately three times the radius of curvature of the concave first major surface.

* * * * *